United States Patent
Nagase et al.

(10) Patent No.: US 6,168,315 B1
(45) Date of Patent: Jan. 2, 2001

(54) ROLLING BEARING UNIT WITH TONE WHEEL

(75) Inventors: Motohiko Nagase, Fujisawa; Hideo Ouchi, Sagamihara, both of (JP)

(73) Assignee: NSK Ltd., Tokyo (JP)

(*) Notice: Under 35 U.S.C. 154(b), the term of this patent shall be extended for 0 days.

(21) Appl. No.: 09/358,038

(22) Filed: Jul. 20, 1999

Related U.S. Application Data

(62) Division of application No. 08/787,588, filed on Jan. 22, 1997.

(30) Foreign Application Priority Data

Jan. 22, 1996 (JP) .......................................... 8-8492
Feb. 21, 1996 (JP) ........................................ 8-33450

(51) Int. Cl.[7] ................................................ F16C 33/72
(52) U.S. Cl. ............................................................ 384/448
(58) Field of Search ............................ 384/448; 324/173, 324/207.25

(56) References Cited

U.S. PATENT DOCUMENTS

| | | | |
|---|---|---|---|
| 4,161,120 | 7/1979 | Cloarec | 73/494 |
| 4,850,722 | 7/1989 | Bayer | 384/448 |
| 5,085,519 | 2/1992 | Dougherty | 384/448 |
| 5,261,752 | 11/1993 | Ouchi et al. | 384/448 |
| 5,431,413 | 7/1995 | Hajzler | 384/448 X |
| 5,458,420 | 10/1995 | Otto | 384/448 |
| 5,567,058 | 10/1996 | Morita et al. | 384/448 |
| 5,575,568 | 11/1996 | Rigaux et al. | 384/448 |
| 5,611,545 | 3/1997 | Nicot | 384/448 X |
| 5,622,437 | 4/1997 | Alff | 384/448 |

FOREIGN PATENT DOCUMENTS

| | | |
|---|---|---|
| 3809904 | 10/1989 | (DE) . |
| 4135789 | 5/1992 | (DE) . |
| 0376771 | 7/1990 | (EP) . |
| 0387459 | 9/1990 | (EP) . |
| 0495323A | 7/1992 | (EP) . |
| 0532011 | 3/1993 | (EP) . |
| 0607719A | 7/1994 | (EP) . |
| 0657738A | 6/1995 | (EP) . |
| 2599794 | 12/1987 | (FR) . |
| 1604862 | 12/1981 | (GB) . |
| 2204647A | 11/1988 | (GB) . |
| 60-112757 | 7/1985 | (JP) . |
| 62-242130 | 10/1987 | (JP) . |
| 6421219 | 1/1989 | (JP) . |
| 527679 | 4/1993 | (JP) . |
| 637766 | 5/1994 | (JP) . |
| 651874 | 7/1994 | (JP) . |
| 665624 | 9/1994 | (JP) . |

Primary Examiner—Thomas R. Hannon
(74) Attorney, Agent, or Firm—Helfgott & Karas, PC.

(57) ABSTRACT

A bearing unit with tone wheel includes a first seal member made from a metal plate having an elastic member, and a second seal member provided outside the first seal member and placed in sliding contact with the elastic member. The tone wheel is attached to the outside face of the second seal member.

3 Claims, 13 Drawing Sheets

PROIR ART

ROLLING BEARING UNIT WITH TONE WHEEL

CROSS-REFERENCE TO RELATED APPLICATION

This application is a division of application Ser. No. 08/787,588 filed Jan. 22, 1997 and now allowed.

BACKGROUND OF THE INVENTION

1. Field of the Invention

The present invention is related to a rolling bearing unit with tone wheel which rotatably support a vehicle wheel with reference to the suspension apparatus while detecting the rotating speed of the vehicle wheel supported by this rolling bearing unit.

2. Description of the Related Art

A rolling bearing unit with tons wheel disclosed for example in JP Utility Model Publication KOKAI No. HS-27679 and JP Patent Publication KOKAI No. 64-21219 is known in the art to support a vehicle wheel with reference to the suspension apparatus while detecting the rotating speed of the vehicle wheel to control the antilock brake system (ABS) or traction control system (TCS).

The rolling bearing unit with tone wheel disclosed in the publication mentioned above is constructed as shown in FIG. 1.

There is a hub 1 having at its axially outer end portion (the widthwise outer end portion when installed in the vehicle, the left end portion in FIG. 1) an outer peripheral surface formed with a flange 2 to fix the vehicle wheel (not shown) to it.

The hub 1 has, at its intermediate portion, an outer peripheral surface formed with an inner ring raceway 3a, and at its axially inner end portion (the widthwise central side end portion when installed, in the vehicle; the right end portion in FIG. 5) an outer peripheral surface fitted with an inner ring 4 formed with an inner ring raceway 3b on its outer peripheral surface. The hub 1 and inner ring 4 form a rotating inner ring member or assembly.

Disposed on the outer peripheral surface of the stationary outer ring 5 is a mount portion 6 which supports the outer ring 5 to the suspension apparatus, and disposed on the inner peripheral surface of the outer ring 5 is a plurality of outer ring raceways 7d, 7b. Disposed between the outer ring raceways 7a, 7b and the inner ring raceways 3a, 3b are a plurality of rolling elements 8 to rotatably support the hub 1 on the inner side of the outer ring 5 which is supported by the mount portion 6 on the suspension apparatus.

Seal rings 9, 10 are fitted and secured to the opposite opening portions of the outer ring 5 such that the seal rings 9, 10 have an inner peripheral edges in sliding or rubbing contact with the outer peripheral surface of the inner ring 4 and hub 1, respectively, so that rain water and muddy matter are prevented from entering the space inside the outer ring 5 where the rolling elements are installed.

As to the pair of seal rings 9, 10, the seal ring 9 on the axially inner side has a function of preventing the penetration of rain water and muddy matter, and a function as a tone wheel of detecting the rotating speed of the hub 1. Specifically, the seal ring 9 as shown in FIG. 2, is an assembly of the radially inner seal ring 11 fitted into the inner ring 4 rotating with the vehicle wheel, and a radially outer seal ring 12 fitted into the stationary outer ring 5.

The radially inner seal ring 11 is an assembly of a reinforcing metal 13a and seal member 14a of rubber or synthetic resin etc. while the radially outer seal ring 12 is an assembly of a reinforcing metal 13b and seal member 14b of rubber or synthetic rein etc. A reinforcing metal 13a has a circular ring portion 15a and a cylindrical portion 16a bent axially from the inner peripheral edge of the circular ring portion 15a while the reinforcing metal 13b has a circular ring portion 15b and a cylindrical portion 16b bent axially from the outer peripheral edge of the circular ring portion 15b. The cylindrical portion 16a is fitted onto the inner ring 4 while the cylindrical portion 16b is fitted into the outer ring 5 so that the seal rings 11, 12 are fixedly supported by the inner ring 4 and outer ring 5, respectively.

The seal members 14a reinforced by the reinforcing members 13a has peripheral edges in sliding or rubbing contact with the inner peripheral surface and side face of the mating reinforcing metal 13b, respectively. The seal members 14b reinforced by the reinforcing members 13b has a peripheral edge in sliding or rubbing contact with the outer peripheral surface of the mating reinforcing metal 13a. The seal between the outer peripheral portion at the axially inner end of the inner ring 4 and the inner peripheral portion at the axially inner end of the outer ring 5 is comprised of a plurality seal lips (three seal lips in the figure) to secure the sealing performance sufficiently.

In the reinforcing metal 13a fixedly fitted on the inner ring 4 rotating with the vehicle wheel, the circular ring portion 15a is formed with a number of through-holes 17 spaced apart from each other with a uniform space circumferentially. Accordingly, the magnetic property of the circular ring portion 15a is changed circumferentially alternately with a uniform interval, so that the circular ring portion 15a has a function as tone wheel.

A sensor 18 is supported by the non-rotating portion such as the suspension apparatus, and the detecting portion of the sensor 18 to detect the rotating speed is faced to the portion where the through-holes 17 are formed.

In the case of the rolling bearing unit with tone wheel as mentioned above, the vehicle wheel fixed to the flange 2 provided on the axially outer end portion of the hub 1, can be rotatably supported with respect to the suspension apparatus supporting the outer ring 5.

As the vehicle wheel rotates, the radially inner seal ring 11 fitted onto the inner ring 4 rotates, resulting in that the output of the sensor 18 opposed to the radially inner seal ring 11 changes. The frequency at which the output of the sensor 18 changes is proportional to the rotating speed of the vehicle wheel. Accordingly, the output signal of the sensor 18 is input to the controllers (not shown) to obtain the rotating speed of the vehicle wheel to suitably control the ABS and TCS.

In the case of the prior art rolling bearing unit with tone wheel as mentioned above, both of the radially inner and outer seal rings 11, 12 are provided with the seal member 14a, 14b, respectively. Therefore, the seal rings 11, 12 must be sufficiently cared during production and handling. Specifically, the sial member 14a supported by the reinforcing metal 13a of the radially inner seal ring 11 which functions as a tone wheel must be cared so that it is not damaged by muddy water splashing against it during the movements of vehicle. This is referred to as muddy water proof.

In addition, the seal members 14a, 14b of the seal rings 11, 12 must be sufficiently cared so that their peripheral edges or tip ends are not damaged during the time of period from the production to the assembling them between the outer peripheral surface of the inner ring 4 and the inner peripheral surface of the outer ring 5.

These cares will lead to cost-up of the rolling bearing unit with tone wheel having the radially inner seal ring 11.

In addition, the seal ring 9 installed in the rolling bearing unit with tone wheel can achieve a sufficient seal performance while the rotating speed of the vehicle wheel is detected, but unavoidably increases the production cost. Specifically, since the resilient members 14a, 14b are provided adjacent to the pair of reinforcing plate 13a, 13b of the seal ring 9, the production processes of the inner seal ring 11 and the outer seal ring 12 are so inconvenient to increase the cost of the seal ring 9 comprising the inner and outer seal rings 11, 12 in assembly.

In order to prevent such cost increase, the resilient member 20 as shown in FIG. 3, is attached to only the stationary seal ring 19 fitted and secured to the stationary ring such as the outer ring 5, and the resilient member 20 is provided with seal lips 21 in sliding or rubbing contact with the surface of the slinger 22 fitted and secured to the rotating ring such as the inner ring 4. In such a construction, however, no cutout such as through hole, notch could be formed in the portion of the slinger 22 with which the seal lips 21 are in sliding or rubbing contact, and therefore the function for tone wheel could not be achieved.

In order that the slinger 22 is provided with the function of tone wheel, the circular ring portion 23 of the slinger 22 is radially extended as shown in FIG. 4, and the cutouts such as notches 24 are formed circumferentially with a uniform interval on the tip half portion (upper half portion in FIG. 4) of the circular ring portion 23, so that the seal lips 21 are placed in sliding or rubbing contact with the base half portion (lower half portion in FIG. 4) of the circular ring portion 23.

However, in such a structure, the size in the radial direction of the circular ring portion 23 must be sufficiently large to secure the portion enough in size for sliding or rubbing contact with the seal lips 21, and a step portion 25 must be formed in the stationary ring such as outer ring 5 to avoid interference with the circular ring portion 23.

It is inconvenient to form the stepped portion 25 in the stationary ring made of a hard material such as bearing steel, leading to cost-up.

SUMMARY OF THE INVENTION

An object of the present invention is to provide a bearing unit with tone wheel having a first seal member made from a metal plate having an elastic member, and a second seal member provided outside the first seal member and placed in sliding contact with the elastic member and a tone wheel attached to the outside face of the second seal member.

DETAILED DESCRIPTION OF THE PREFERRED EMBODIMENTS

Figure 1:
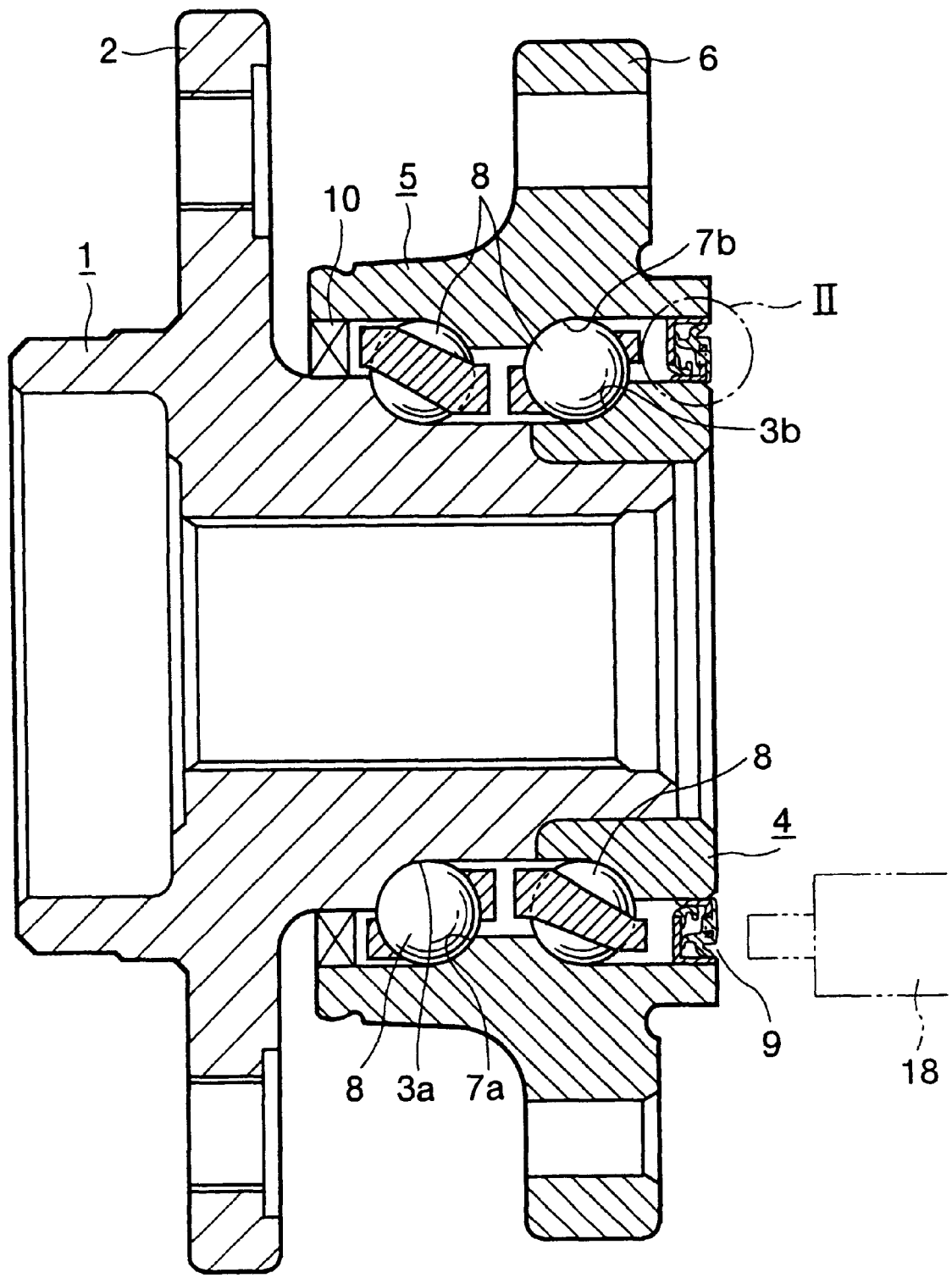
FIG. 1 is a cross sectional view of one example of the prior art rolling bearing unit with tone wheel.
Figure 2:
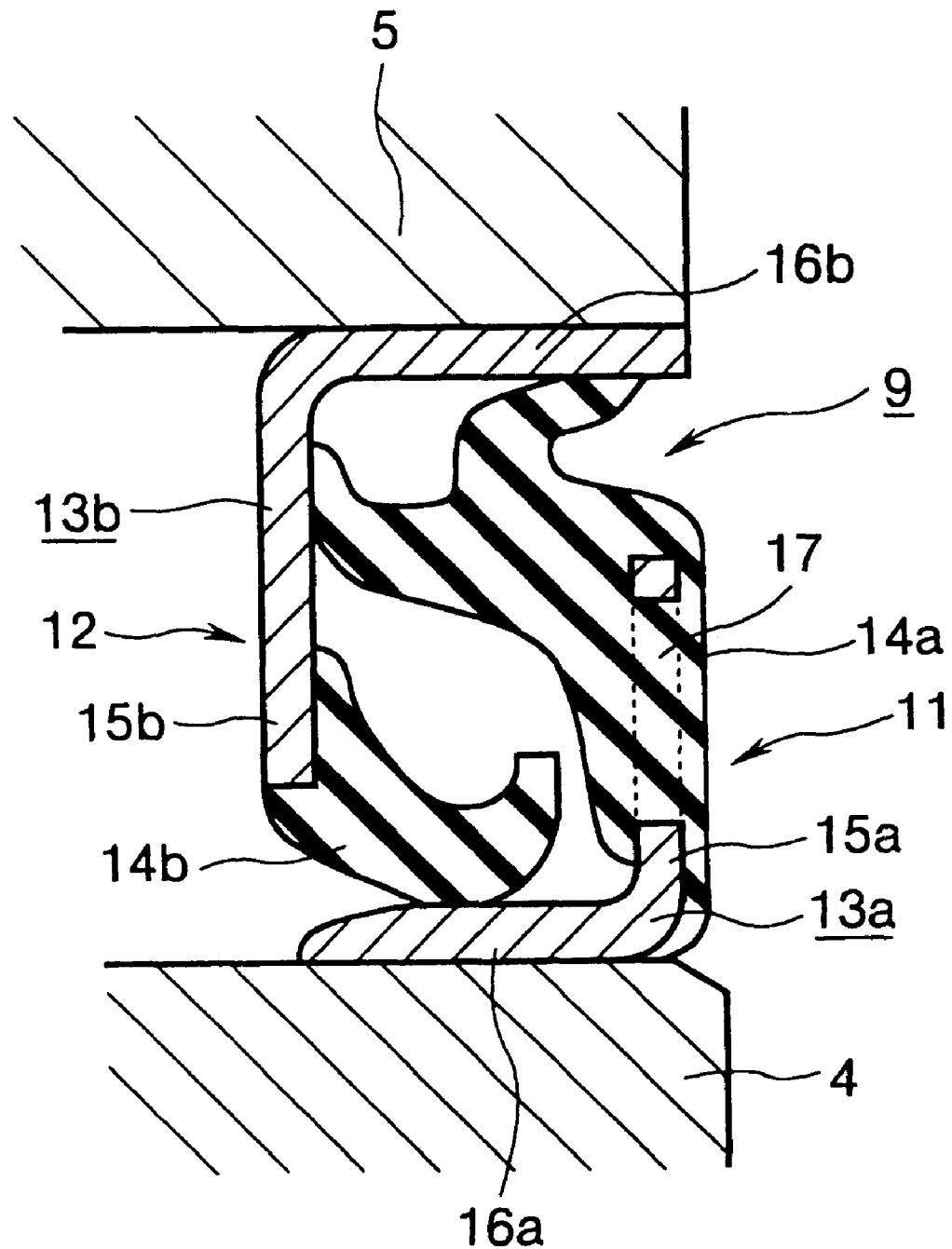
FIG. 2 is an enlarged view of Section II in FIG. 1.
Figure 3:
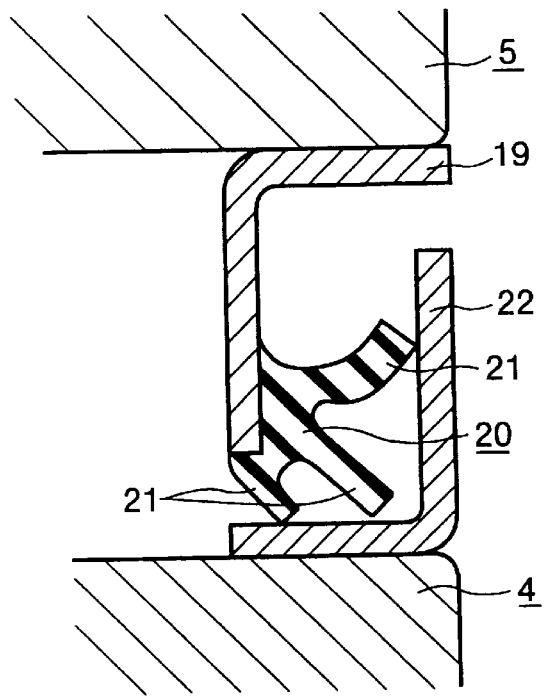
FIG. 3 is an enlarged view similar to FIG. 2 in another example of the prior art rolling bearing unit with tone wheel.

The rolling bearing unit with tons wheel in the first embodiment of the present invention comprises, like the conventional rolling bearing unit with tone wheel as mentioned above, an outer ring member which is stationary during use and has an inner peripheral surface formed with an outer ring raceway, an inner ring member which is rotatable during use and has an outer peripheral surface formed with an inner ring raceway, a plurality of rolling elements provided between the outer ring raceway and inner ring raceway, a seal ring fitted and secured into the inner peripheral surface at an end portion of the outer ring member to cover a gap extending circumferentially between the inner peripheral surface of the outer ring member and the outer peripheral surface of the inner ring member at the end portion thereof, and a tone wheel made from a magnetic plate in a generally annular shape to have a magnetic property changing circumferentially alternately with a uniform interval and fitted and secured to the outer peripheral surface at the one end of the inner ring member.

In the rolling bearing unit with tone wheel of the embodiment, the slinger is made in a generally annular shape and in a L-shape in cross section, and has a radially inner cylindrical portion formed in its inner peripheral edge portion and fitted onto the outer peripheral surface at the one end of the inner ring member, and an radially outer circular ring portion bent from the outside end edge of the radially inner cylindrical portion to extend radially outwards.

Specifically, a generally annular reinforcing metal in the L-shape in cross section of the seal ring is provided on the inner peripheral surface of the end portion of the stationary outer ring member, and has a radially outer cylindrical portion on its outer peripheral edge portion fitted into the inner peripheral surface of the end portion of the outer ring member, and a radially inner circular ring portion bent from the radially outer cylindrical portion extending radially inwards with reference to the inner peripheral surface of the end portion of the outer ring member at a position axially outer of the rotatable circular ring portion, that is the circular ring portion of the slinger.

The seal member is fixed generally along the periphery of the stationary circular ring portion, that is the circular ring portion of the seal ring, and has seal lips having tip ends placed in sliding or rubbing contact with the slinger.

At least one seal lip has its tip end in sliding or rubbing contact with the inside face of the rotatable circular ring portion.

The tone wheel has an engagement portion formed on the outer peripheral edge portion thereof and attached and secured to the outside face of the rotatable circular ring portion with the engagement portion engaged with the outer peripheral edge of the rotatable circular ring portion.

The rolling bearing unit with tone wheel of the embodiment constructed as above rotatably supports the vehicle wheel with reference to the suspension apparatus, and detects the rotating speed of the vehicle wheel in a similar member as the conventional bearing units with tone wheel.

Particularly, the seal member is fixed only to the reinforcing metal and not to the slinger in the rolling bearing unit with tone wheel in the present embodiment. Only the tone wheel is attached to the outside face of the rotatable circular ring portion of the slinger. Accordingly, it is easy to produce and handle the slinger and tone wheel, leading to the cost reduction of the rolling bearing unit with tone wheel.

Figure 5:
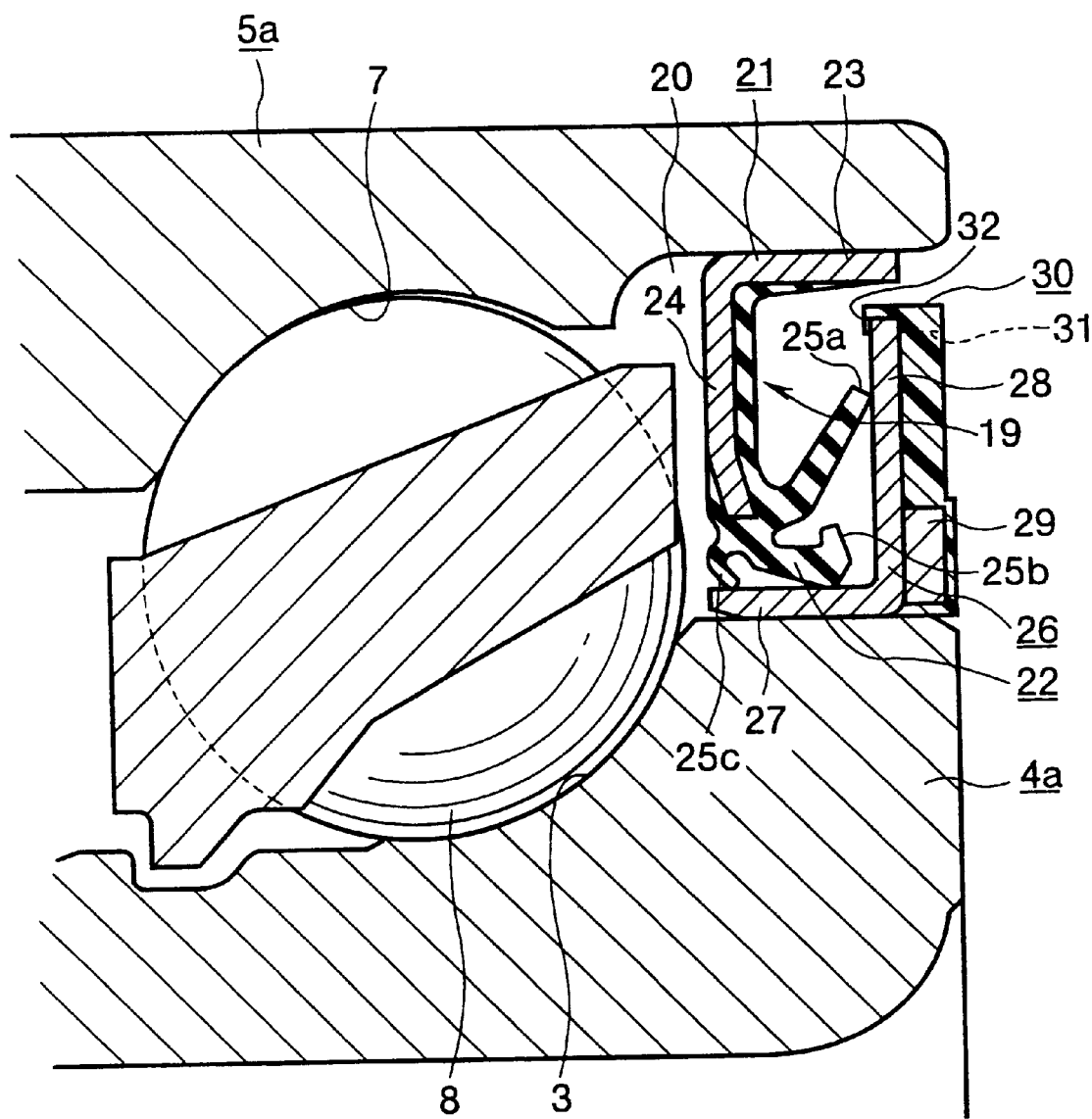
FIG. 5 is a cross sectional view of one example in the embodiments of the present invention.
Figure 6:
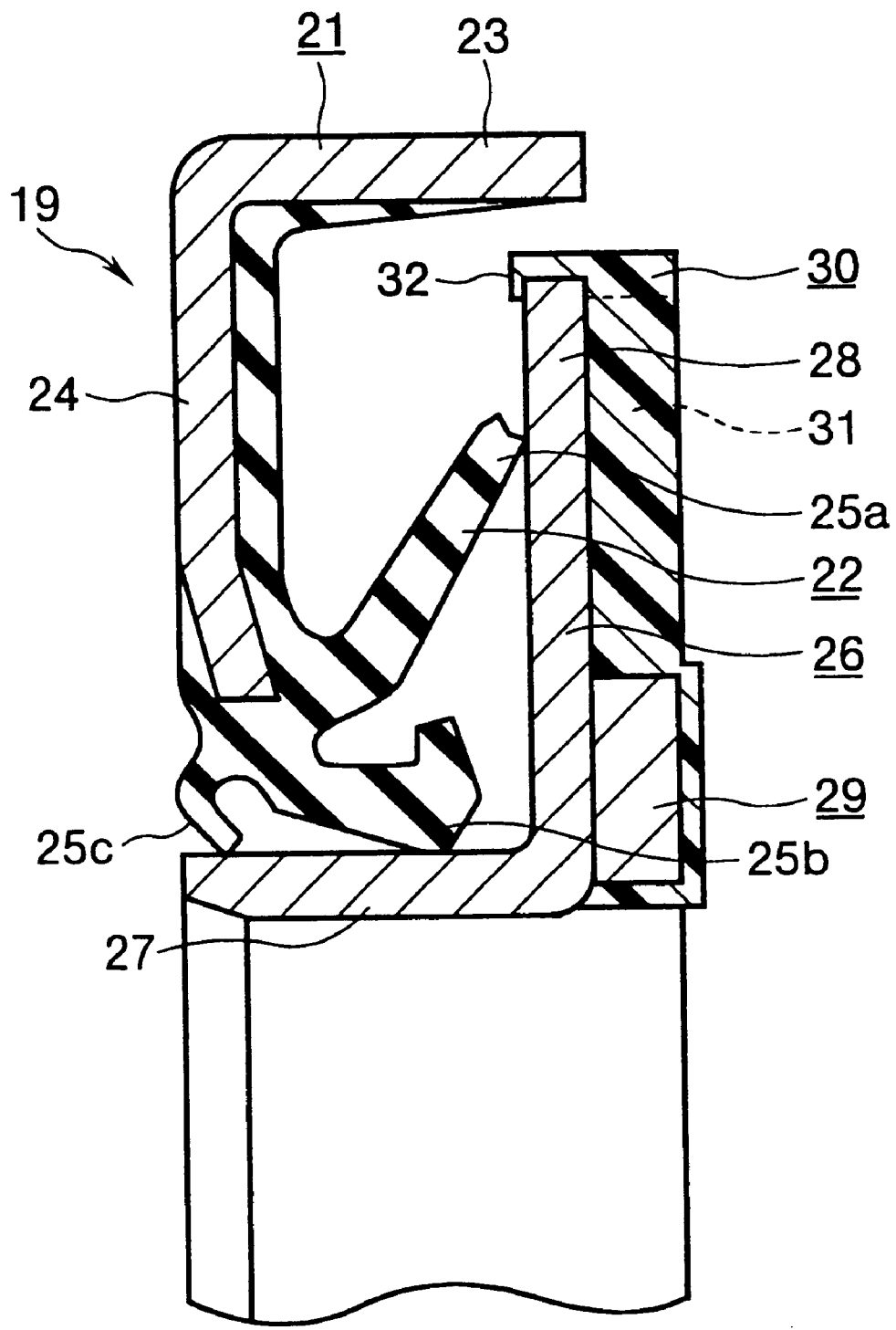
FIG. 6 is an enlarged view of the portion having a slinger and seal ring assembly to which a tone wheel is attached.

FIGS. 5 and 6 show a first example of an embodiment of the present invention. Outer ring raceways 7 in double rows are formed on an inner peripheral face of an outer ring 5a which does not rotate during use. Moreover, respective inner ring raceways 3 are formed on outer peripheral faces of a pair of inner rings 4a which rotate during use, and which are fitted over an axle (not shown in FIG. 5). A plurality of rolling elements 8 are respectively provided between each of the respective outer ring raceways 7 and the inner ring raceways 3, thereby rotatably supporting the axle inside the outer ring 5a.

With the example shown in FIG. 5, balls are used for the rolling elements 8. However in the case of a rolling bearing unit for heavy vehicles, tapered rollers may be used for the rolling elements 8.

A seal ring 19 is internally fitted to an inner peripheral face on the axially inner end portion of the outer ring 5a, so as to cover around the whole periphery of a space 20 between the inner peripheral face on the axially inner end portion of the outer ring 5a and the outer peripheral face on the axially inner end portion of the inner ring 4a. The seal ring 19 is made from a reinforcing member 21 formed from a metal plate, and a seal member 22 formed from a resilient material such as rubber or an elastomer or the like. The reinforcing member 21 is formed in an overall annular shape of L-shape in cross-section, with a radially outer cylindrical portion 23 formed on an outer peripheral rim portion, and a fixed side disc portion or circular ring portion 24 bent radially inwards at right angles from an end rim (left end rim in FIGS. 5 and 6) of the radially outer cylindrical portion 23. With the metal shell 21, the radially outer cylindrical portion 23 is internally secured to the inner peripheral face on the axially inner end portion of the outer ring 5a, with the fixed side disc portion 24 protruding radially inwards therefrom. The seal member 22 is securely supported by the fixed side disc portion 24, and has a plurality (shown typically as three in the figures) of seal lips 25a, 25b and 25c.

A slinger 26 formed in an overall annular shape of L-shape in cross-section, is externally secured to the outer peripheral face on the axially inner end portion of the inner ring 4a. The slinger 26 is formed in an overall annular shape of L-shape in cross-section from a metal plate such as steel plate or stainless steel plate, and has a radially inner cylindrical portion 27 formed on an inner peripheral rim portion thereof, and a rotating side disc portion or circular ring portion 28 bent radially outwards at right angles from an end rim (right end rim in FIGS. 5 and 6) of the radially inner cylindrical portion 27. With the slinger 26, the radially inner cylindrical portion 27 is externally secured to the outer peripheral face on the axially inner and portion of the inner ring 4a, with the rotating side disc portion 28 protruding radially outwards therefrom.

With the slinger 26 externally secured in this way to the outer peripheral face an the axially inner end portion of the inner ring 4a, the rotating side disc portion 28 is further to the opening side (right side in FIGS. 5 and 6) of the space 20 than the fixed side disc portion 24. Furthermore, with the three seal lips 25a, 25b and 25c provided on the seal member 22, the tip rim of the seal lip 25a provided radially furthest outward, rubs against the inside face (left side face in FIGS. 5 and 6) of the rotating side disc portion 28, while the tip rims of the other two seal lips 25b, 25c rub against the outer peripheral face of the inner diameter cylindrical portion 27.

A tone wheel 29 is fixed to the outside face (right side face in FIGS. 5 and 6) of the rotating side disc portion 28, by means of a resilient member 30 made for example from synthetic resin or hard rubber. The tone wheel 29 is formed by punching a magnetic material such as carbon steel plate having a thickness of for example 0.6–2.0 mm, so as to give a plurality of cut-outs 31 in the form of openings in an outer peripheral rim, at even spacing around the circumference. The tone wheel 29 thus has a comb teeth form.

The punching process is preferably carried out from the inside face (left side face in FIGS. 5 and 6) of the tone wheel 29 to the outside face (right side face in FIGS. 5 and 6). The reason for this is so that the edges of the respective cut-outs 31 are sharp on the side facing the sensor 18 (refer to FIG. 1), thus improving the detection accuracy of the sensor 18.

The resilient member 30 is wrapped around the tone wheel 29 and molded. That is to say, the resilient member 30 covers both the inner and outer peripheral portions of the tone wheel 29 as well as the inner peripheral half on the outside face, also filling the respective cut-outs 31, thus giving an overall single body with the tone wheel 29 embedded therein. Moreover, an engagement portion 32 of L-shape in cross-section, is formed completely or intermittently around an outer peripheral rim portion of the resilient member 30 on the inside face (left side face in FIGS. 5 and 6). The tone wheel 29 is thus fixed to the outside face of the rotating side disc portion 28, by engaging the engagement portion 32 with the outer peripheral rim portion of the rotating side disc portion 28.

With the rolling bearing unit with tone wheel according to the present invention constructed as described above, the seal member 22 is fixed to the reinforcing metal 21 only, and not to the slinger 26. Moreover, with the rotating side disc portion 28 of the slinger 26 has the tone wheel attached only to its outside face. Consequently, the manufacture and handling of the slinger 26 and the tone wheel 29 is simplified, thus enabling a reduction in the cost of the rolling bearing unit with tone wheel. That is to say, in the case of the construction of first example shown in FIGS. 5 and 6, the tore wheel 29 is fixed to the slinger 26 by means of the resilient member 30, which has the sole role of connecting the tone wheel 29 to the slinger 26, and has no sealing function. Consequently, the quality of the resilient member 30 need not be limited to that to maintain a seal. Moreover, since small scratches on the resilient member 30 present no problem, there is no need for special care when handling the slinger 26 fitted with the tone wheel 29. In other words, care is only required when handling the seal ring 19, and hence parts management and handling is simplified.

Figure 7:
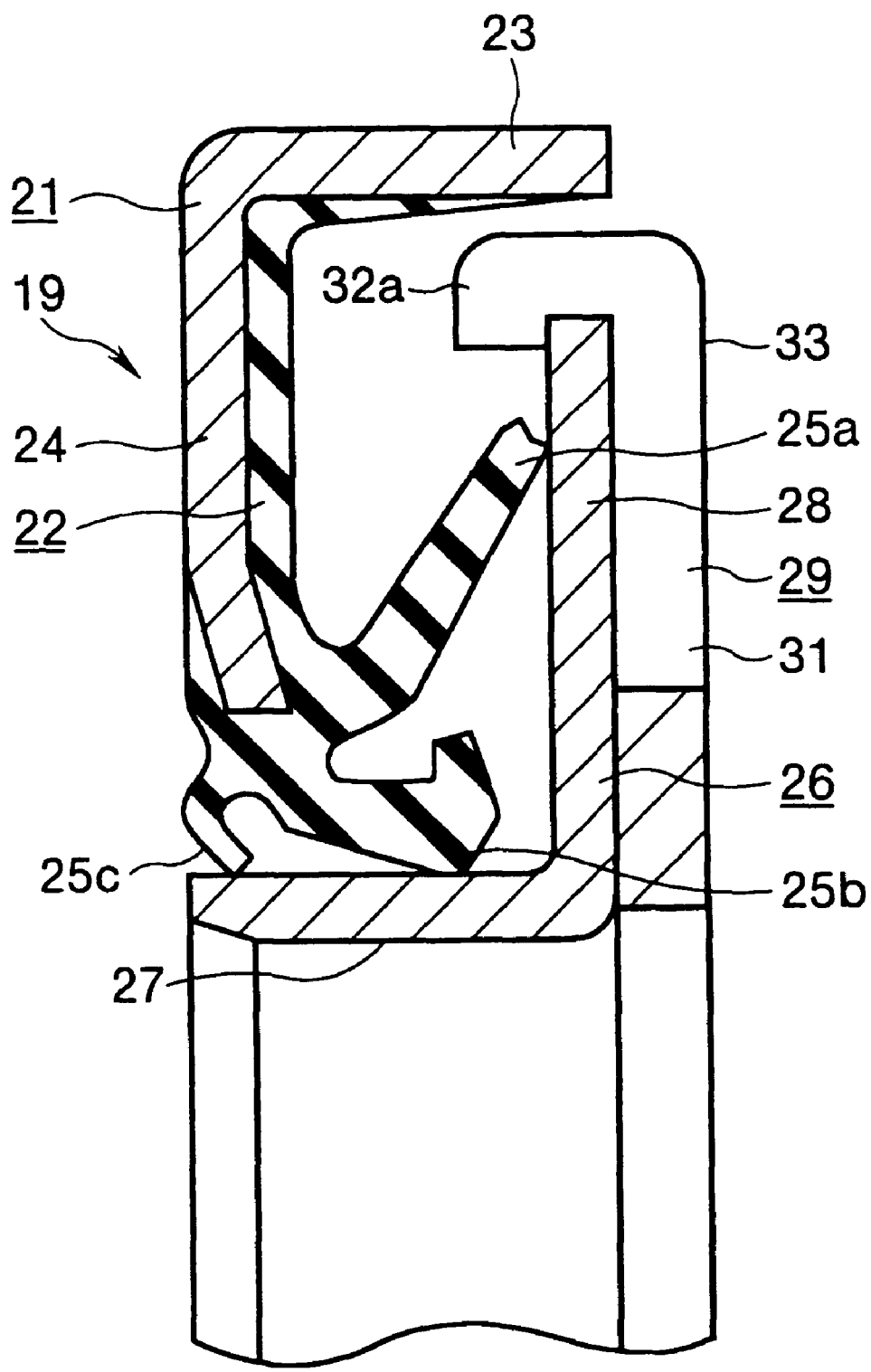
FIG. 7 is a cross sectional view of another example in the embodiments of the present invention, similar to FIG. 6.

FIG. 7 shows a second example of the first embodiment of the present invention. With this example, the resilient member 30 (FIGS. 5 and 6) is omitted, and instead the tone wheel 29 is fixed to the outside face (right side face in FIG. 7) of the rotating side disc portion or circular ring portion 28 of the slinger 26, by means of engagement portions 32a formed by bending back an outer peripheral rim of a tone wheel 29. That is to say, the engagement portions 32a are formed by bending back the tip portions of finger portions 33 existing between adjacent cut-outs 31 around the periphery at the outer peripheral rim portion of the tone wheel 29, at the outer peripheral rim of the rotating side disc portion 28, so that the tone wheel 29 is fixed to the outside face of the rotating side disc portion 28 by these engagement portion 32a. If there is the possibility of interference of the engagement portions 32a with the seal ring 19, then a part of the magnetic metal plate forming the tone wheel 29 can be made thinner at the portion forming the engagement portions 32a. This thinning operation can be carried out by coining, prior to forming the engagement portion 32a, or can be carried out afterwards by machining with a lathe. Other details of the operation and construction are the same as for the beforementioned first example.

Figure 8:
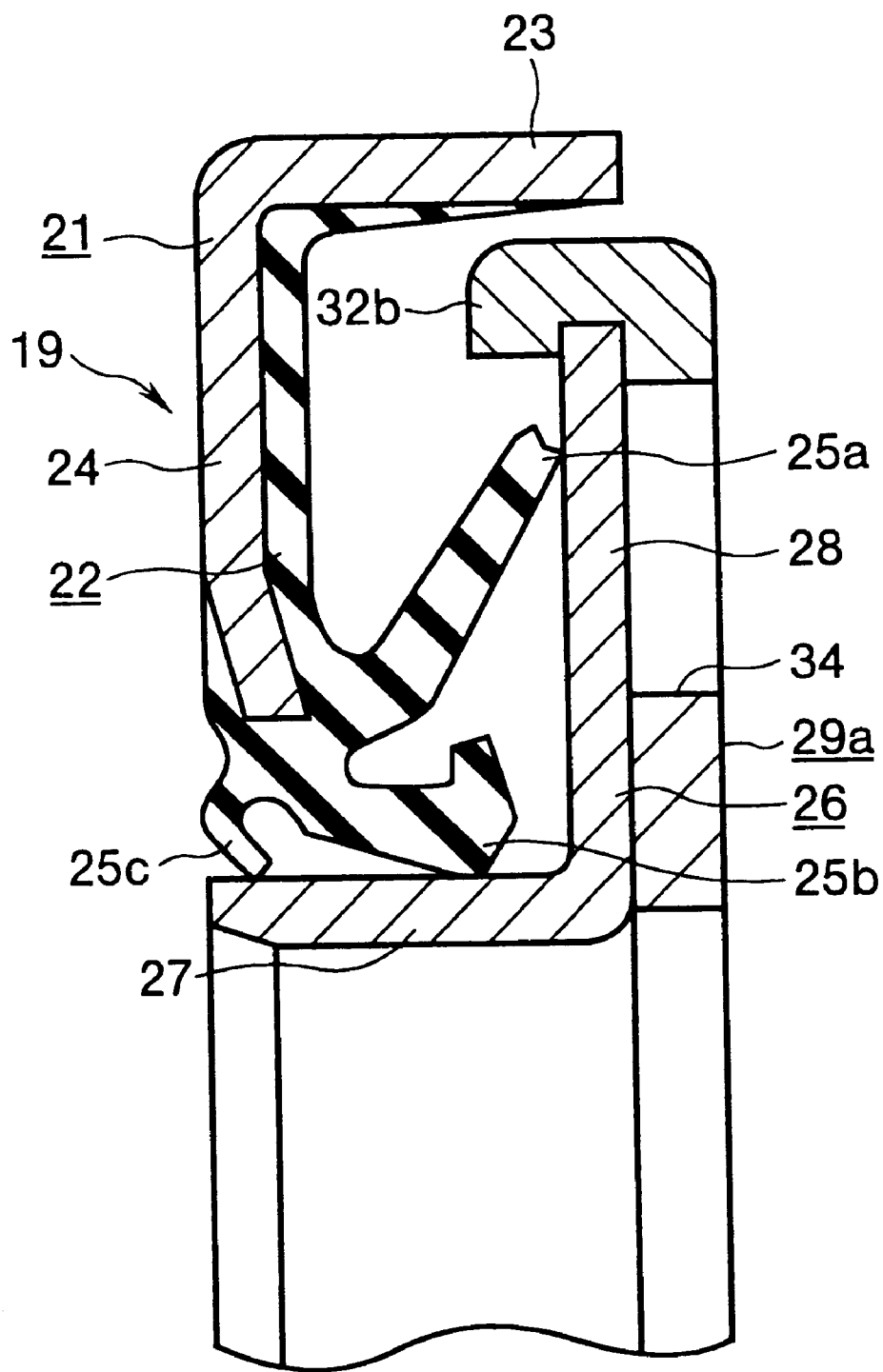
FIG. 8 is a cross sectional view of another example in the embodiments of the present invention, similar to FIG. 6.

FIG. 8 shows a third example of the embodiment of the present invention. With this example, a plurality of through holes 34 are formed in a magnetic metal plate tone wheel 29a, at even spacing around the circumference. An engagement portion 32b is formed by bending an outer peripheral rim portion of the tone wheel 29a at the outer peripheral rim of the rotating side disc portion 28, so that the tone wheel 29a is fixed to the outside face (right side face in FIG. 8) of the rotating side disc portion 28 by means of the engagement portion 32b.

If the operation of bending back the outer peripheral rim portion of the tone wheel 29a around the whole periphery is inconvenient, then a plurality of cut-outs may be formed in the outer peripheral rim portion, so that the bending back operation can be carried out with less force and without distortion of the tone wheel 29a. Other details of the operation and construction are the substantially same as for the second example.

Some seal rings are disclosed in the following part of the specification.

The seal ring assembly with tone wheel of the present embodiment covers the open end portion of the space between the peripheral surface of the stationary and rotatable rings or ring members, while detecting the rotating speed of the rotatable ring.

The seal ring assembly with tone wheel comprises a seal ring fixed to a peripheral surface of the stationary ring, a slinger fixed to a peripheral surface of the rotatable ring, and a tone wheel supported by and fixed to the slinger.

The seal ring comprises a reinforcing metal comprising a stationary cylindrical portion fitted and fixed to the peripheral surface of the stationary ring and a stationary circular ring portion bent toward the peripheral surface of the rotatable ring from the and edge of the stationary cylindrical portion, and a resilient member having a seal lip provided generally along the periphery of the reinforcing metal. The slinger comprises a rotatable cylindrical portion fitted and fixed to the peripheral surface of the rotatable ring, and a rotatable circular ring portion or disc portion bent toward the peripheral surface of the stationary ring from the end edge of the rotatable cylindrical portion, but no resilient member.

The peripheral surface of the rotatable cylindrical portion and one side surface of the rotatable circular ring portion with which the tip end of the seal lip is placed in sliding or rubbing contact are made flat. The tone wheel is provided adjacent to the other side face of the rotatable circular ring portion, and the magnetic property of the tone wheel changes alternately circumferentially with a uniform interval. The tone wheel can be mounted to the other side face of the circular ring portion by welding, bending or crimping etc.

In the seal ring assembly with tone wheel as mentioned above, the seal ring is placed fitted and fixed to the peripheral surface of the stationary ring, and the slinger is to the peripheral surface of the rotatable ring, and the seal lips of the resilient member of the seal ring are placed in sliding or rubbing contact with the surfaces of the slinger.

The tone wheel attached to the other side face of the rotatable circular ring portion of the slinger is faced to a detecting portion of the sensor.

In this condition, the seal ring assembly comprising the seal ring and slinger covers the space between the peripheral surface of the stationary and rotatable rings or ring members.

Accordingly, no foreign matter can enter the space, and no grease filled in the space leaks out of the space.

The slinger itself has no function for tone wheel in the seal ring assembly in the embodiments, so that the tip end edges of the resilient seal lips attached to the seal ring can be placed in sliding or rubbing contact with the flat surface even without increasing the side in the radial direction of the slinger.

The resilient member is attached to the seal ring and not to the slinger, so that the whole cost of the seal ring assembly can be reduced.

The tone wheel is fixed to the other side face of the circular ring portion of the slinger, so that the function of the tone wheel is secured.

Figure 9:
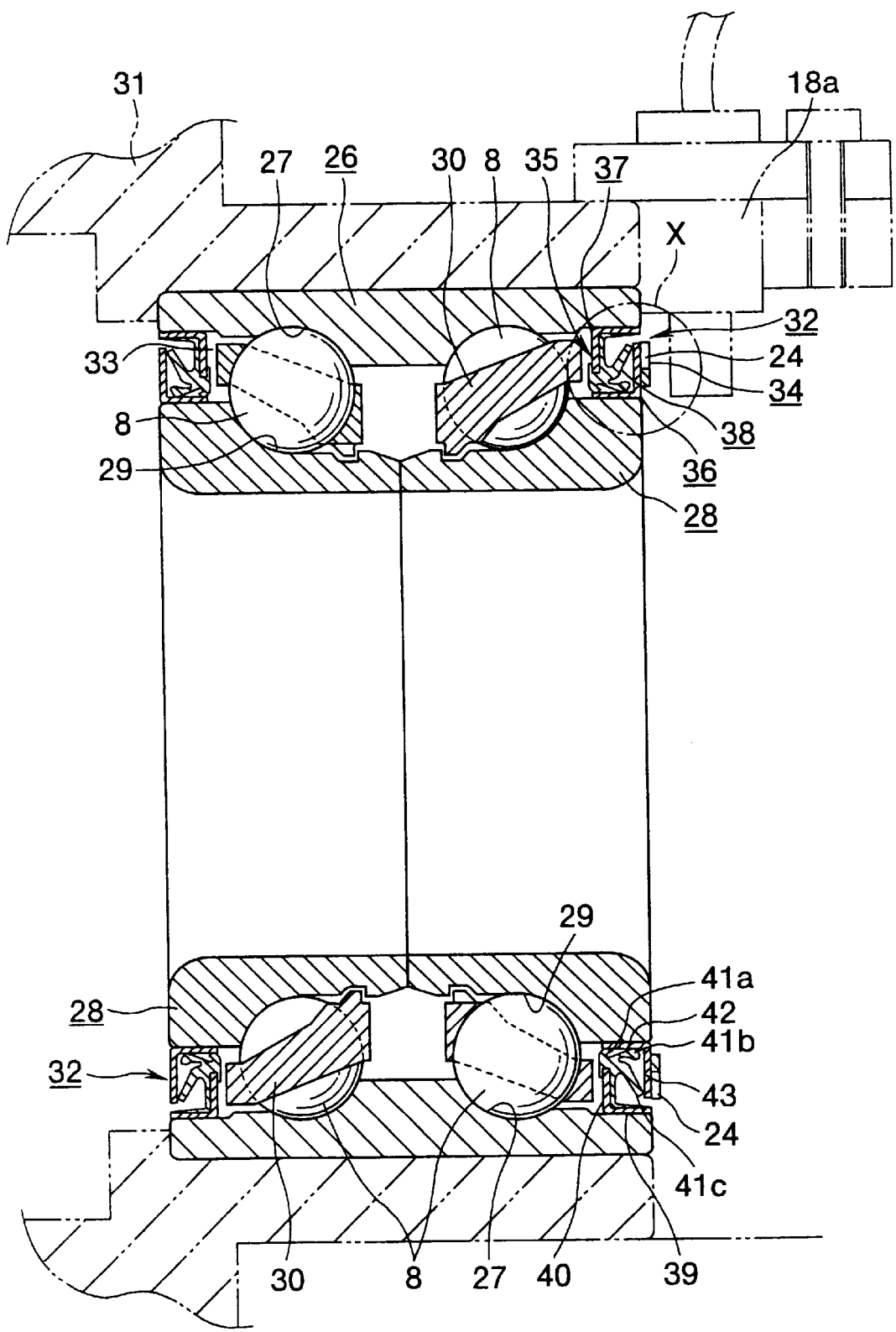
FIG. 9 is a cross sectional view showing another example of the embodiments of the present invention.
Figure 10:
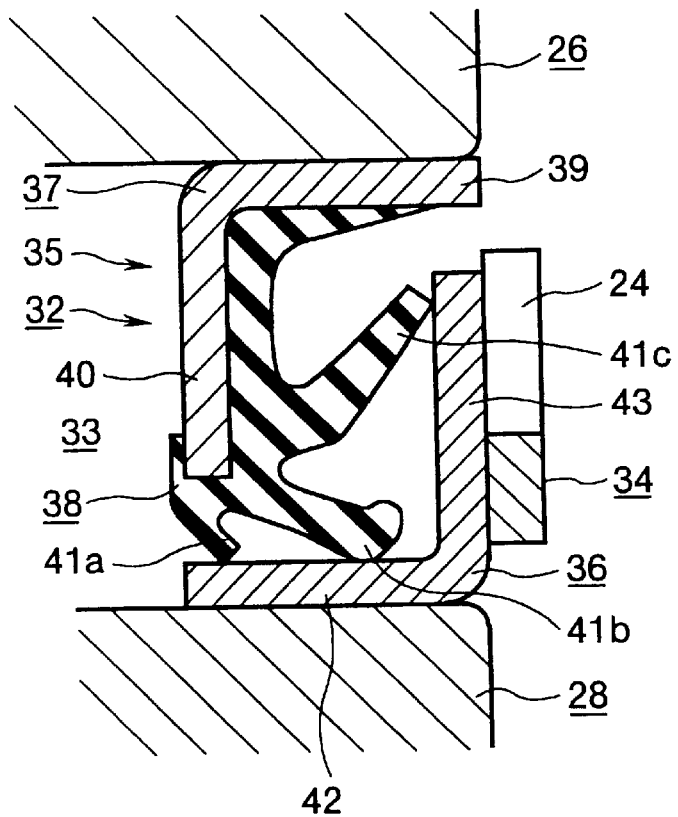
FIG. 10 is an enlarged view of Section X in FIG. 9.
Figure 11:
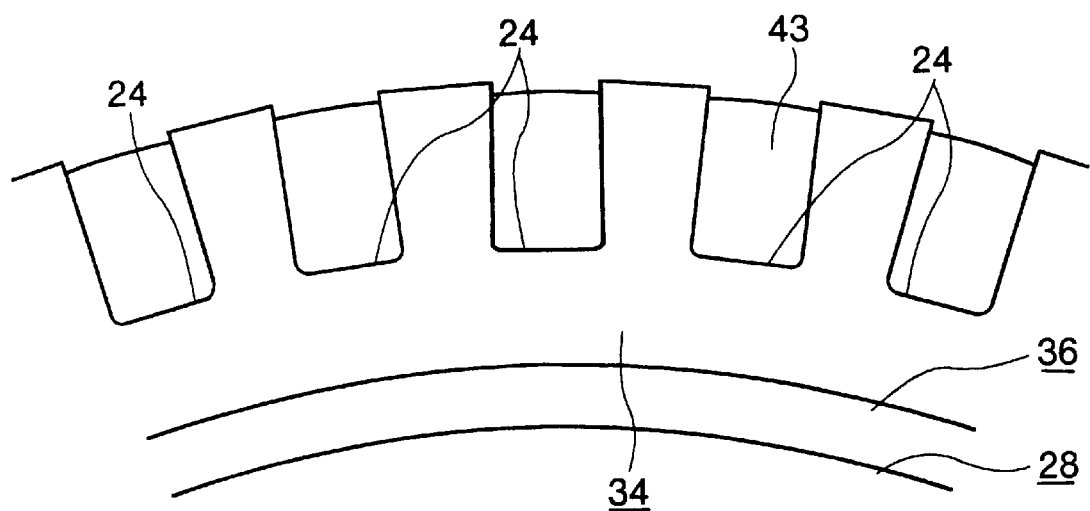
FIG. 11 is a right side view of the slinger and tone wheel assembly of FIG. 10.

FIGS. 9 through 11 show a first example of a second embodiment of the present invention. Outer ring raceways 27 in double row are formed on an inner peripheral face of an outer ring or fixed ring 26, while respective inner ring raceways 29 are formed on the outer peripheral faces of inner rings or rotating rings 28. A plurality of rolling elements 8, retained by means of a retainer or cage 30, are rotatably provided between each of the respective outer ring raceways 27 and the inner ring raceways 29. When fitted to a vehicle, the outer ring 26 is internally secured to a bearing housing 31 of a suspension unit, and a drive shaft (not shown in the figures) for rotating a vehicle wheel, is inserted through the respective inner rings 28.

Respective seal ring assemblies 32 are provided between the inner peripheral faces on the axially opposite ends portions of the outer ring 26 and the outer peripheral faces on the corresponding end portions of the respective inner rings 28, to thereby isolate from the outside, a space 33 in which the respective rolling elements 8 are provided between the inner peripheral face of the outer ring 26 and the outer peripheral faces of the inner rings 28.

The seal ring assemblies 32 are of the same construction, and are inserted symmetrical with each other. Consequently, the mass production effect enables a reduction in cost compared to the case where seal ring assemblies 32 for the inner and outer end portions are made different. It should be noted, however, that a tone wheel 34 is fitted to the seal ring assembly 32 on the axially inner end (right side end in FIG. 9), thus giving the seal ring assembly with tone wheel according to the present invention. A description of this seal ring assembly with tone wheel is given hereunder.

The seal ring assembly with tone wheel incorporates a seal ring 35 fixed to an inner peripheral face on an axially inner end portion of the outer ring 26, a slinger or frame metal 36 fixed to an outer peripheral face on the axially inner end portion of the inner ring 28, and a tone wheel 34 securely supported by the slinger 36.

The seal ring 35 is made from a reinforcing metal 37 and a resilient member 38. The reinforcing metal 37 is formed in an overall annular shape of L-shape in cross-section by bending a metal plate such as a steel plate. The reinforcing metal 37 incorporates a fixed side cylindrical portion 39 internally secured to the inner peripheral face on the axially inner end portion of the outer ring 26, and a fixed side disc portion 40 bent radially inwards from the axially outer end rim of the fixed side cylindrical portion 39, towards the outer peripheral face of the inner ring 28.

Moreover, the resilient member 38, formed from a rubber or an elastomer or the like, has a plurality (shown typically as three in the figures) of seal lips 41a–41c, and is adhered for example by thermal bonding, fully around the reinforcing metal 37.

The slinger 36 also is formed in an overall annular shape of L-shape in cross-section by bending a metal plate such as a steel plate. The slinger 36 incorporates a rotating side cylindrical portion 42 externally secured to the outer peripheral face on the axially inner end portion of the inner ring 28, and a rotating side disc portion 43 bent radially outward from the axially inner end rim of the rotating side cylindrical portion 42, towards the inner peripheral face of the outer ring 26.

The slinger 36 is made solely from metal plate, and does not have a resilient member 38 as with the seal ring 35. Moreover, recesses or protrusions such as through holes or cut-outs are not formed in either of the rotating side cylindrical portion 42 or the rotating side-disc portion 43, so that the parts rubbed by the tip rims of the seal lips 41a–41c at the outer peripheral face of the rotating side cylindrical portion 42 and the inside face or axially outer face of the rotating side disc portion 43 are formed as smooth flat surfaces.

The tone wheel 34 is made in an overall disc shape or circular ring shape by punch forming a magnetic metal plate such as a steel plate. A plurality of cut-outs 24 forming respective openings in the outer peripheral rim, are formed at even spacing around the circumference, so that the magnetic properties around the circumferential direction change alternately and at even spacing.

The tone wheel 34 is fixed to the outside face or axially inner face of the rotating side disc portion 43 by welding, for example spot welding, or by bonding. When thus secured, the tone wheel 34 and the slinger 36 are concentric with each other.

Since the tone wheel 34 and the slinger 36 are exposed for example to water and mud from the road, etc., then corrosion prevention must be considered. Consequently, when made from metal plate such as SPCC, corrosion prevention treatment such as chrome plating must be carried out on the surface. Alternatively the parts may be made completely from magnetic stainless steel plate such as SUS430. With the chrome plating corrosion prevention treatment, in the case where the tone wheel 34 and the slinger 36 are connected together by welding, the plating treatment is carried out after welding.

Since the welded portion is opposite to or far from the rolling elements 8 with reference to the resilient member 38 of the sealing device, it is not necessary for the welded portion to be air tight. Therefore, spot welding can be used for the welding. With spot welding, the attachment strength is strong and attachment cost is low. Moreover distortion of the tone wheel 34 and the slinger 36 due to heating is minimal, so that seal performance is only marginally impaired. Consequently, this is considered the ideal method for connecting the tone wheel 34 to the slinger 36.

The seal ring assembly with tone wheel according to the present invention constructed as described above is fitted, as shown in FIGS. 9 and 10, between the inner peripheral face on the axially inner end portion of the outer ring 26, and the outer peripheral face on the axially inner end portion of the inner ring 28, with the seal ring 35 internally secured to the inner peripheral face of the outer ring 26, and the slinger 36 externally secured to the outer peripheral face of the inner ring 28.

Moreover, in the assembled condition, where the plurality of seal lips 41a–41c of the resilient member 38 makes up the seal ring 35, the seal lips 41a, 41b rub against the outer peripheral face of the rotating side cylindrical portion 42 of the slinger 36, while the remaining seal lip 41c rubs against the inside face or axially outer face of the rotating side disc portion 43. At the outside face or axially inner face of the tone wheel 34 which is fixed to the axially inner face of the rotating side disc portion 43 of the slinger 36, a detection portion of a sensor 18a is positioned so as to face the radially outer half portion formed with the cut-outs 24.

With the seal ring assembly with tone wheel fitted in this way between the inner peripheral face on the axially inner end portion of the outer ring 26 and the outer peripheral face on the axially inner end portion of the inner ring 28, the composite seal ring assembly 32 comprising the seal ring 35 and the slinger 36, covers between these inner and outer peripheral faces, so that as well as preventing the ingress of foreign matter into the space 33 between the two peripheral face pairs, and that grease filled into the space 33 is prevented from leaking to the outside.

Moreover, when the inner ring 28 rotates together with the vehicle wheel, so that the tone wheel 34, which is fixed to the inner ring 28 by means of the slinger 36 rotates, the output signal from the sensor 18a changes with a frequency proportional to the rotational speed of the vehicle wheel. Therefore, if the output signal from the sensor 18a is input to a controller (not shown in the figures), the rotational speed of the vehicle wheel can be obtained, thus enabling appropriate control of an anti-lock braking system (ABS) or a traction control system (TCS).

Figure 4:
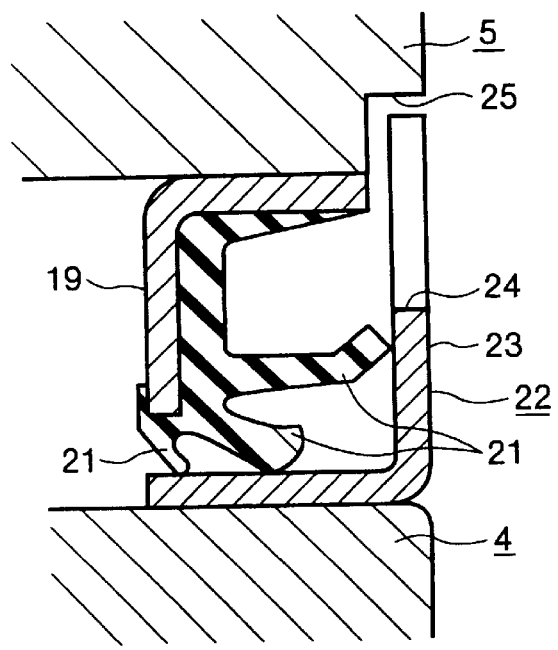
FIG. 4 is an enlarged view similar to FIG. 2 in an example of the rolling bearing unit with tone wheel which was produced prior to the present invention.

In particular, with the seal ring assembly with tone wheel according to the present invention, the slinger 36 itself does not have the function of a tone wheel, and in spite of the fact that the radial dimension of the slinger 36 is not particularly large as shown with the construction of FIG. 4, the tip rims of the respective seal lips 41a–41c provided on the resilient member 38 provided adjacent to the seal ring 35, can still rub against a flat smooth surface. Consequently, it is not necessary to form a step 25 of (FIG. 4) or the like in the fixed outer ring as with the construction shown in FIG. 4.

Moreover since the resilient member 38 is only fixed to the seal ring 35, with no resilient material fixed to the slinger 36, then the overall cost for the seal ring assembly can be reduced.

In the case where the tone wheel 34 and the slinger 36 are connected together by spot welding, then in order to minimize the influence on the seal performance, of distortion of the slinger 36 due to heat generated at the time of welding, the two members 34 and 36 are preferably connected at a part away from the portion where the respective seal lips 41a–41c are placed in sliding contact. For example, with the construction shown in FIGS. 9 to 11, the radially inner half portion of the tone wheel 34 (the portion radially inwards of the portion with the cut-outs 24) and the radially inner half portion of the rotating side disc portion 43 of the slinger 36, are spot welded at several locations around the circumferential direction. If the location of the spot welds is controlled in this way, then even with slight distortion of the slinger 36, this will give negligible impairment to the seal performance.

Figure 12:
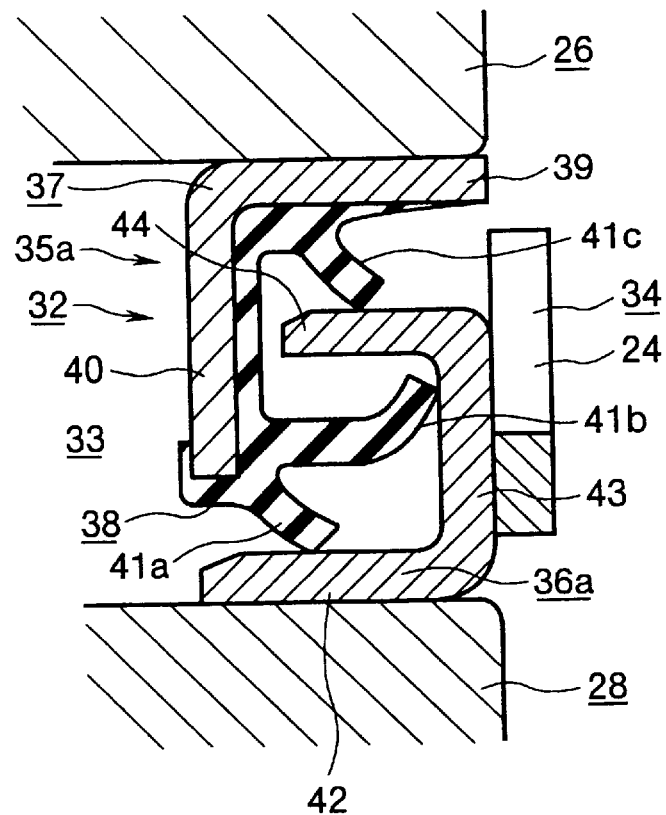
FIG. 12 is an enlarged view similar to FIG. 10 to show another example of the embodiments of the present invention.
Figure 13:
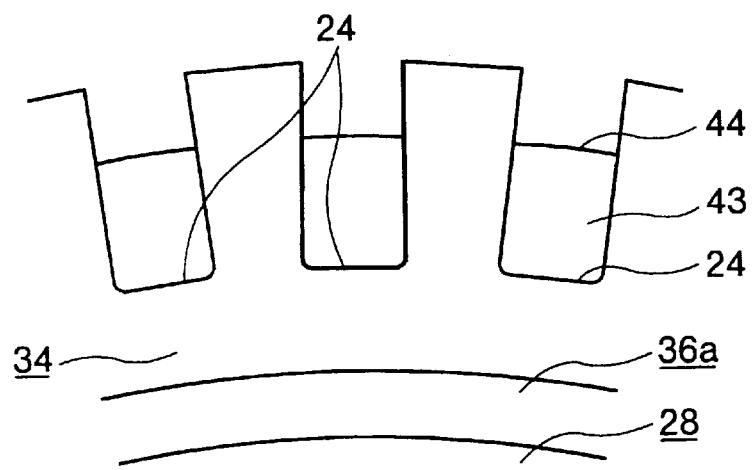
FIG. 13 is a view similar to FIG. 11 to show another example.

FIGS. 12 and 13 show a second example of the second embodiment of the present invention. With this example, the cross-sectional shape of the slinger 36a is J-shaped. That is to say, a radially outer cylindrical portion 44 is formed by bending a half portion on the outer diameter side of the rotating disc portion 43, at right angles in the same direction as the rotating cylindrical portion 42. Moreover, tip rims of three seal lips 41a, 41b and 41c of a seal ring 35a respectively rub against the outer peripheral face of the rotating side cylindrical portion 42, the inside face or axially outer face of the rotating side disc portion 43, and the outer peripheral face of the radially outer cylindrical portion 44. Moreover, the half portion on the outer diameter side of the tone wheel 34 which is fixed to the outside face or axially inner face of the rotating side disc portion 43 by welding or bonding or the like, protrudes radially further outward (in the upward direction of FIGS. 12 and 13) than the outer peripheral face of the outer diameter cylindrical portion 44.

With the example constructed in this way, the passage between the seal ring 35a and the slinger 36, through which foreign matter can enter from outside to the interior of the space 33, and which is the cause of leakage of grease filled inside the space 33, is bent. Therefore, compared to the abovementioned first example, the seal performance of the composite seal ring 32 is further improved. Moreover a tone wheel 34 secured to a slinger 36a also functions as an auxiliary slinger for slinging and throwing muddy water and the like when the vehicle wheel is rotating. Hence the seal performance is even better. Other details of the operation and construction are substantially the same as for the beforementioned first example.

Figure 14:
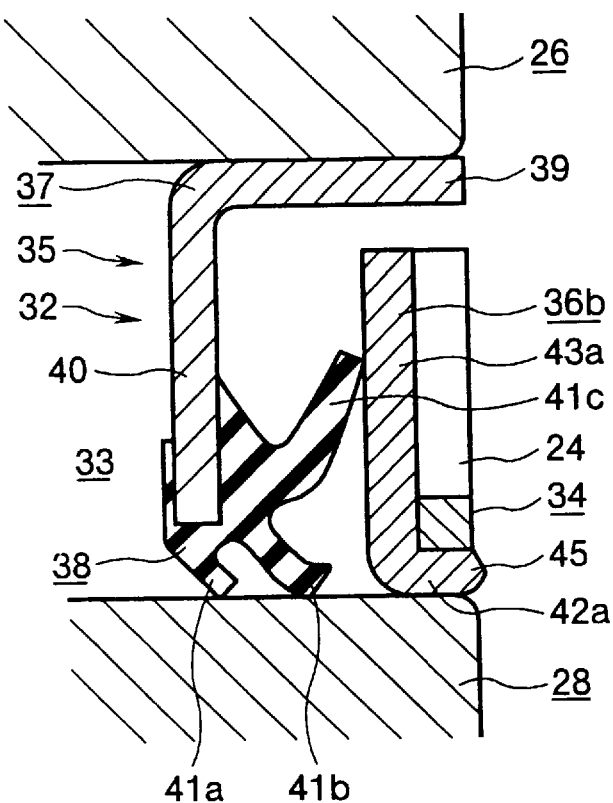
FIG. 14 is an enlarged view similar to FIG. 10 to show another example of the embodiments in the present invention.
Figure 15:
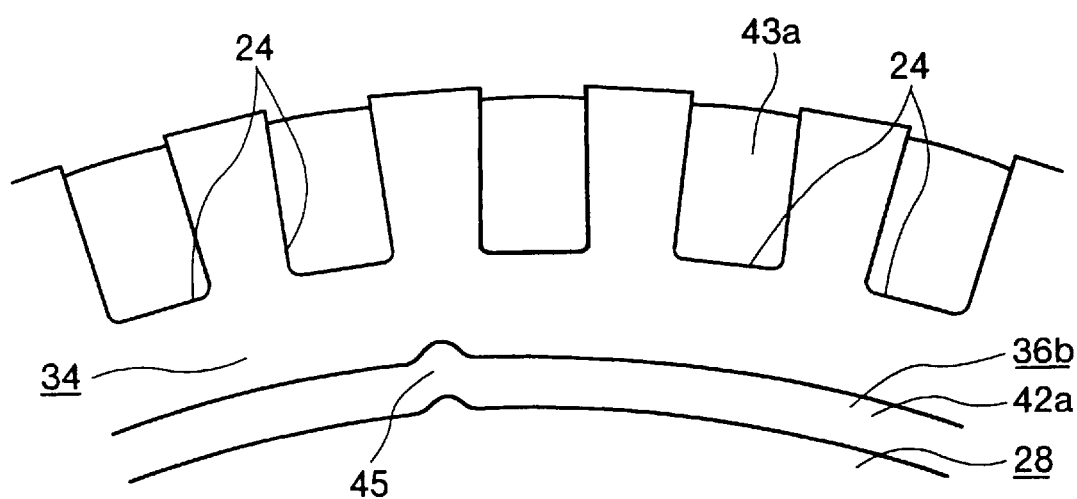
FIG. 15 is a view similar to FIG. 11 to show another example.

FIGS. 14 and 15 show a third example of the second embodiment according to the present invention. With this example, a rotating disc portion 43a of a slinger 36b extends radially outwards from an axially outer end rim of a rotating cylindrical portion 42a. Moreover, a tone wheel 34 is provided adjacent to an axially inner end face of the rotating side disc portion 43a, and crimped portion 45 is formed by crimping so as to expand radially outwards, at several locations around the periphery of the rotating cylindrical portion 42a (or around the whole periphery). By means of this crimped portion 45, the inner peripheral rim of the tons wheel 34 is restrained. Moreover, of three seal lips 41a, 41b and 41c of a seal ring 35, tip rims of the seal lips 41a, 41b are respectively rubbed against an outer peripheral face on an axially inner end portion of an inner ring 28, while a tip rim of the seal lip 41c is rubbed against the axially outer face of the rotating side disc portion 43a.

With the present example, since the tip end portion (right end portion in FIG. 14) of the rotating cylindrical portion 42a is made to protrude from the axially inner face of the tone wheel 34, and the crimped portion 45 is formed from this protruding portion, then the support strength for the tone wheel 34 can be increased. However, since the force tending to separate the tone wheel 34 from the rotating disc portion 43a is only slight, there is no real need to have the tip end portion protruding from the axially inner face of the tone wheel 34. Moreover, having no protrusion is advantageous from the point of preventing interference between the rotating cylindrical portion 42a and the sensor 18a (FIG. 9). Other details of the construction and operation are the substantially same as for the abovementioned first example.

Figure 16:
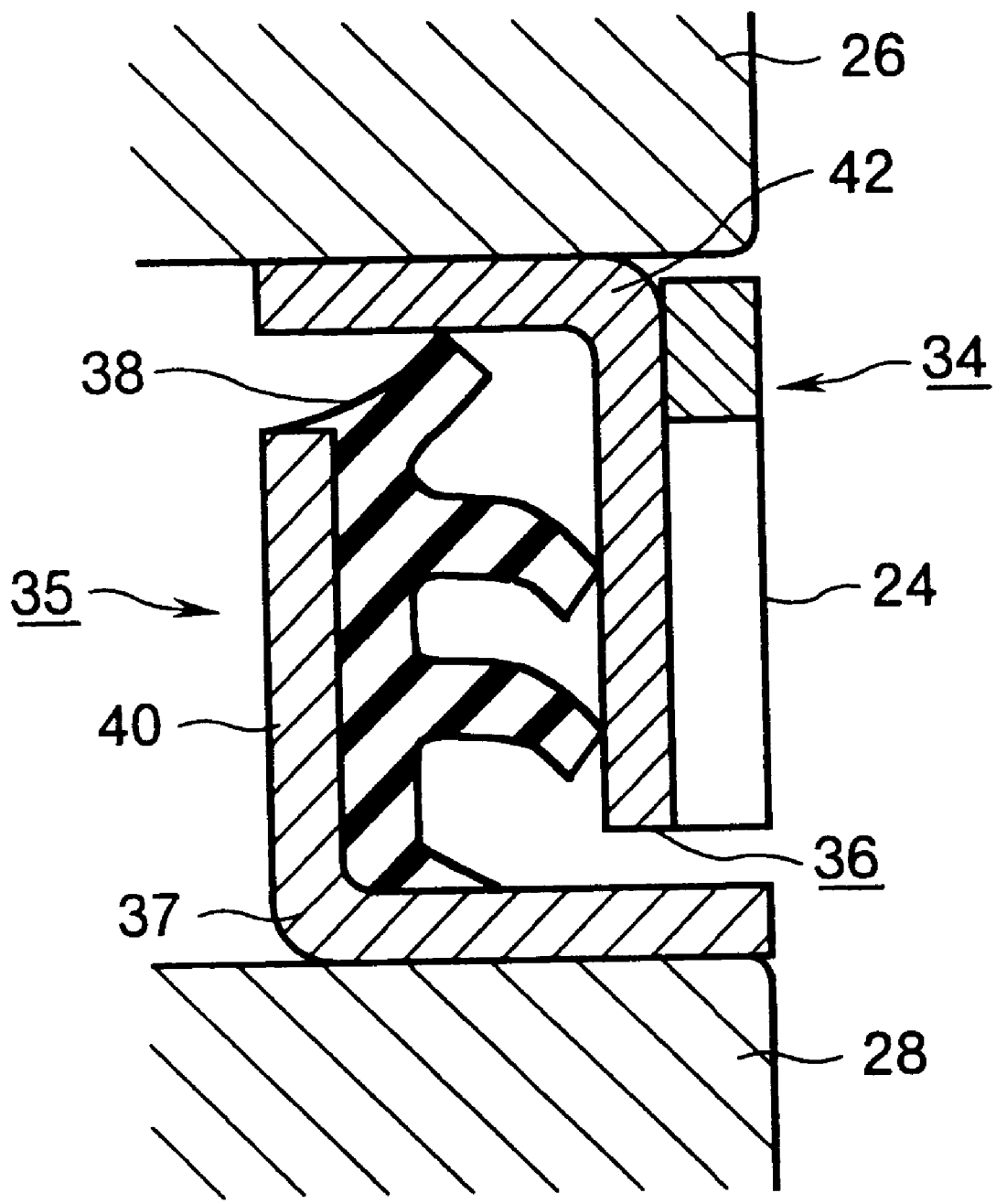
FIG. 16 is an enlarged view similar to FIG. 10 to show another example.
Figure 17:
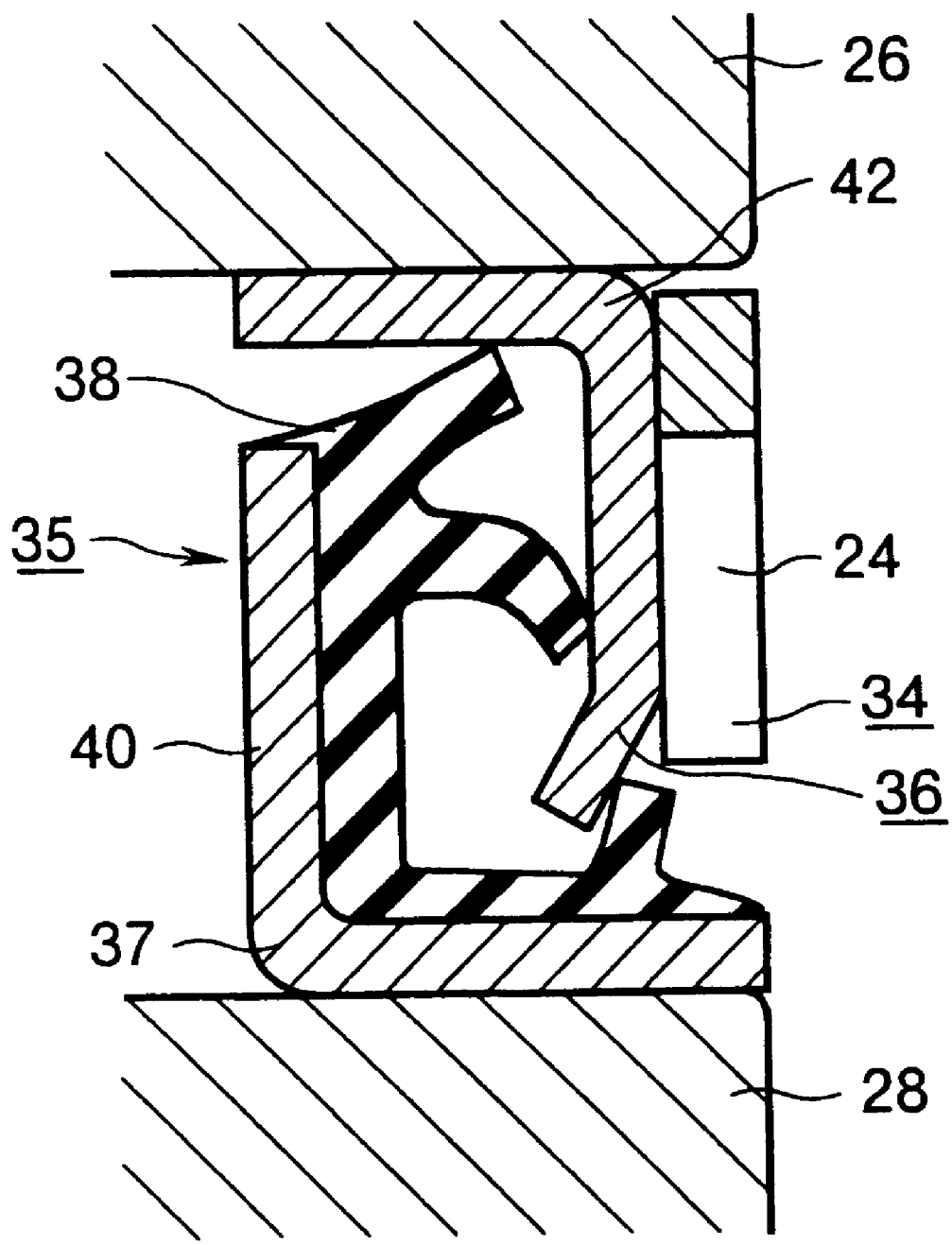
FIG. 17 is an enlarged view similar to FIG. 10 to show another example.

With the abovementioned respective examples, the descriptions have all been for the case where the fixed ring is the outer ring 26 and the rotating ring is the inner ring 28. The present invention may however be carried out with an opposite arrangement, with the fixed inner ring and the outer rotating ring. In this case, inwards and outwards for the radial directions, will be opposite to the examples shown in the figures. Specifically, in FIGS. 16 and 17, the outer ring 26 is rotatable while the inner ring 28 is stationary. The slinger 36 and tone wheel 34 are mounted to the outer ring 26 while the seal ring 35 is mounted to the inner ring 28. A spot weld 60 is shown in the figures.

What is claimed is:

1. A rolling bearing unit with tone wheel comprising:
   an outer ring member which is stationary during use and has an inner peripheral surface formed with an outer ring raceway,
   an inner ring member which is rotatable during use and has an outer peripheral surface formed with an inner ring raceway,
   a plurality of rolling elements provided between the outer ring raceway and inner ring raceway,
   a seal ring fitted and secured into the inner peripheral surface at an end portion of the outer ring member to cover a gap extending circumferentially between the inner peripheral surface of the outer ring member and the outer peripheral surface of the inner ring member at the end portion thereof,
   a tone wheel made from a magnetic plate in a generally annular shape to have a magnetic property changing circumferentially alternatively with a uniform interval and fitted and secured to the outer peripheral surface at the one end of the inner ring member,
   a slinger made in a generally annular shape and in a L-shape in cross section, and having a radially inner cylindrical portion formed in its inner peripheral edge portion and fitted onto the outer peripheral surface at the end of the inner ring member and a radially outer circular ring portion bent from an outside end edge of the radially inner cylindrical portion to extend radially outwards,
   the seal ring having a generally annular reinforcing metal in a L-shape in cross section provided on the inner peripheral surface of the end portion of the stationary outer ring member,
   the reinforcing metal having an outer peripheral edge portion formed with a radially outer cylindrical portion fitted into the inner peripheral surface of the end portion of the outer ring member, and a radially inner circular ring portion bent from the radially outer cylindrical portion extending radially inwards with reference to the inner peripheral surface of the end portion of the outer ring member at a position axially outer of the rotatable circular ring portion of the slinger,
   the circular ring portion of the reinforcing metal having a seal member fixed generally along the periphery thereof, and having seal lips with tip ends placed in sliding contact with the slinger,
   at least one seal lip having its tip end in sliding contact with an inside face of the circular ring portion of the slinger, and the tone wheel having an outer peripheral edge portion formed with an engagement portion thereon and provided adjacent to an outside face of the rotatable circular ring portion with the engagement portion engaged with the outer peripheral edge of the circular ring portion of the slinger.

2. A bearing unit comprising:

a bearing section having outer and inner rings one of which is a stationary ring and the other is a rotatable ring, the outer ring having a first end portion formed with an inner peripheral surface and the inner ring having a first end portion formed with an outer peripheral surface, such that a gap extends circumferentially between the inner peripheral surface of the outer ring and the outer peripheral surface of the inner ring, said inner ring has a second end portion flush with a second end portion of said outer ring, a seal assembly having a slinger and a tone wheel disposed in an outer diameter circle of the outer ring and crimped to the slinger, a seal ring fitted and fixed to the peripheral surface at the end portion of the stationary ring and having seal lips to cover the gap, the slinger comprising a cylindrical portion and a circular ring portion, the cylindrical portion fitted and fixed to the rotatable ring to be rotatable together with the rotatable ring and having first and second end edges, the first end edge being adjacent to the seal ring and the second end edge being crimped to the tone wheel for fixing, the circular ring portion bent toward the stationary ring from the first end edge of the cylindrical portion, the circular ring portion having first and second side faces, the first side face being smooth and adjacent to the seal ring and at least one of the seal lips having a tip end placed in sliding contact with the first side face, the tone wheel is flush with the second end portion of the inner ring and is made from a magnetic metal plate and provided adjacent to the second side face of the circular ring portion and concentric with the cylindrical portion and having a plurality of cutouts circumferentially arranged to provide magnetic properties changing alternately circumferentially with a uniform interval.

3. A bearing unit comprising:

a bearing section having outer and inner rings one of which is a stationary ring and the other is a rotatable ring, the outer ring having an end portion formed with an inner peripheral surface and the inner ring having an end portion formed with an outer peripheral surface, such that a gap extends circumferentially between the inner peripheral surface of the outer ring and the outer peripheral surface of the inner ring, a seal assembly having a slinger and a tone wheel disposed in an outer diameter circle of the outer ring and crimped to the slinger, a seal ring fitted and fixed to the peripheral surface at the end portion of the stationary ring and having seal lips to cover the gap, the slinger comprising a cylindrical portion and a circular ring portion, the cylindrical portion fitted and fixed to the rotatable ring to be rotatable together with the rotatable ring and having first and second end edges, the first end edge being adjacent to the seal ring and the second end edge being crimped to the tone wheel for fixing, the circular ring portion bent toward the stationary ring from the first end edge of the cylindrical portion, the circular ring portion having first and second side faces, the first side face being smooth and adjacent to the seal ring and at least one of the seal lips having a tip end placed in sliding contact with the first side face, the tone wheel made from a metal magnetic plate and provided adjacent to the second side face of the circular ring portion and concentric with the cylindrical portion and having a plurality of cutouts circumferentially arranged to provide magnetic properties changing alternately circumferentially with a uniform interval.

\* \* \* \* \*